United States Patent [19]

Schrader et al.

[11] 3,862,272
[45] Jan. 21, 1975

[54] O-ALKYL-S-(2,3-DICHLOROALLYL)-(THIONO)THIOL-PHOSPHONIC ACID ESTERS

[75] Inventors: Gerhard Schrader, Wuppertal; Ingeborg Hammann, Koeln; Bernhard Homeyer, Opladen, all of Germany

[73] Assignee: Bayer Aktiengesellschaft, Leverkusen, Germany

[22] Filed: Feb. 27, 1973

[21] Appl. No.: 336,317

[30] Foreign Application Priority Data
Mar. 4, 1972  Germany............................ 2210604

[52] U.S. Cl................................. 260/956, 424/219
[51] Int. Cl.......... A01n 9/39, C07f 9/16, C07f 9/40
[58] Field of Search...................................... 260/956

[56] References Cited
UNITED STATES PATENTS
2,892,751  6/1959  Saul ............................... 260/956 X
3,662,034  5/1972  Oswald et al. ................. 260/956 X Primary Examiner—Lorraine A. Weinberger
Assistant Examiner—Richard L. Raymond
Attorney, Agent, or Firm—Burgess, Dinklage & Sprung

[57]  ABSTRACT

O-Alkyl-S-[2,3-dichloroallyl]-(thiono)thiol-phosphoric (phosphonic) acid esters of the formula

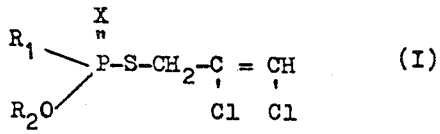

in which
$R_1$ is $C_1$–$C_6$ alkyl, $C_1$–$C_6$ alkoxy or phenyl,
$R_2$ is $C_1$–$C_6$ alkyl, and
X is oxygen or sulfur
which possess insecticidal, acaricidal and nematicidal properties.

5 Claims, No Drawings

O-ALKYL-S-(2,3-DICHLOROALLYL)-(THIONO)THIOL-PHOSPHONIC ACID ESTERS

The present invention relates to and has for its objects the provision of particular new 0-alkyl-S- [2,3-dichloroallyl]- (thiono)thiol-phosphoric (phosphonic) acid esters which possess insecticidal, acaricidal and nematicidal properties, active compositions in the form of mixtures of such compounds with solid and liquid dispersible carrier vehicles, and methods for producing such compounds and for using such compounds in a new way especially for combating pests, e.g., insects, acarids and nematodes, with other and further objects becoming apparent from a study of the within specification and accompanying examples.

U.S. Pat. No. 1,949,629 describes the reaction of 1,2-dichloroethane with the ammonium salt of 0,0-di-isopropyl-thionothiol-phosphoric acid, wherein 0,0-di-isopropyl-S-(2-chloroethyl)-thionothiol-phosphoric acid ester is supposed to be produced in the first reaction stage. However, the isolation, or preparation in the pure form, of this hypothetical intermediate is not disclosed.

According to the information in U.S. Pat. No. 2,266,514 the compound is supposed to be obtained by reaction of equimolar amounts of the above-mentioned starting materials, but data regarding the purity and yields of the product are lacking.

Finally, it is known from German Patent Specification No. 1,005,058 that symmetrical 1,2-dihalogeneoethanes, for example dichloroethane or dibromoethane, in general react with 0,0-dialkylthiol- or 0,0-dialkylthionothiol-phosphoric acid salts, with both halogen atoms being replaced by the thiol-phosphoric acid radical. A selective substitution of the halogen atoms is only possible according to the instructions of the German patent specification cited above in the reaction with 0,0-dialkylthionothiolphosphoric acid salts when working in aqueous solution, while the reaction with the salts of the corresponding thiol-phosphoric acids only leads to the desired result when using methyl ethyl ketone as the solvent.

The present invention provides, as new compounds, thiol- and thionothiol-S-(2,3-dichloroallyl)-phosphoric(phosphonic) acid esters of the general formula

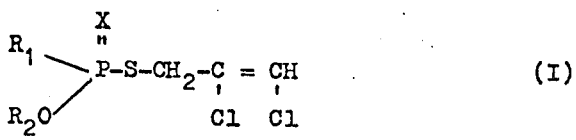

in which
$R_1$ is $C_1$-$C_6$ alkyl, $C_1$-$C_6$ alkoxy or phenyl,
$R_2$ is $C_1$-$C_6$ alkyl, and
X is oxygen or sulfur.

Preferably, $R_1$ is $C_1$-$C_4$ lower alkyl or $C_1$-$C_4$ lower alkoxy, such as methyl, methoxy, ethyl, ethoxy, n- or isopropyl, n- or isopropoxy, n-, iso- or sec.-butyl or n-, iso- or sec.-butoxy, or phenyl. $R_2$ is preferably $C_1$-$C_4$ lower alkyl, for example methyl, ethyl, n- or isopropyl, n-, iso- or sec.-butyl. When $R_1$ and $R_2$ are both alkyl, they need not be identical.

It has been found that the new amidothiolphosphoric acid esters possess excellent insecticidal, acaricidal and nematicidal properties. Surprisingly, the compounds according to the invention are distinguished from the nearest comparable known compounds of analogous structure and identical type of action, by a substantially better insecticidal or acaricidal activity and/or by a substantially lower phytotoxicity; the present compounds thus represent a notable enrichment of the art.

The present invention also provides a process for the production of a compound of the formula (I), in which a thionothiol-phosphoric(phosphonic) acid salt of the general formula

in which
$R_1$, $R_2$ and X have the meanings stated above, and
M is a monovalent metal, a monovalent equivalent of a polyvalent metal or an ammonium group, preferably an alkali metal atom, especially sodium or potassium, or an ammonium group,
is reacted with 1-bromo-2,3-dichloropropene-2 of the formula

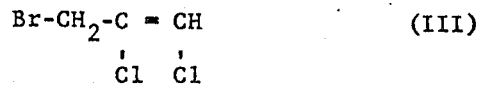

The course of the preparative process can be represented by the following equation:

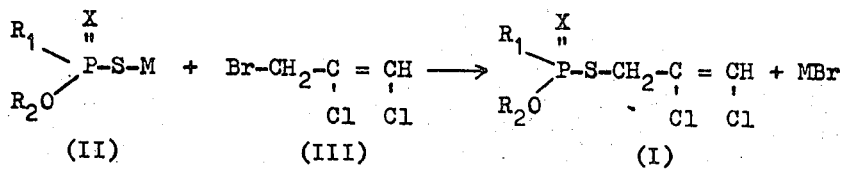

in which
$R_1$, $R_2$, X and M have the meanings stated above.

The 1-bromo-2,3-dichloropropene-2 required as a starting material is easily obtainable on an industrial scale, for example by chlorination of propargyl alcohol and subsequent reaction with phosphorus tribromide.

The preparative process for the compounds (I) is preferably carried out in the presence of a solvent or diluent. Practically all inert organic solvents can be used for this purpose, especially hydrocarbons, such as benzene, toluene, xylene and chlorobenzene, ethers, for example diethyl ether, dibutyl ether, dioxane and tetrahydrofuran, and ketones, for example acetone, methyl ethyl ketone and methyl isopropyl ketone. However, low-boiling aliphatic nitriles, such as acetonitrile and propionitrile, have proved particularly suitable for this purpose.

It is possible to carry out the reaction according to the process over a fairly wide temperature range. In general, the reaction is effected at a temperature of about 10° to 80°C or to the boiling point of the mixture, preferably at about 20° to 80°C or to the boiling point of the mixture.

According to the equation given above, 1 mole of 1-bromo-2,3-dichloropropene-2 is required per mole of thiol- or thionothiol-phosphoric(phosphonic) acid salt. Either a mixture of the particular thiophosphoric(phosphonic) acid salt with one of the above-mentioned solvents, preferably acetonitrile, is initially introduced, and a solution of 1-bromo-2,3-dichloropropene-2 is added dropwise to this mixture, or conversely the solution of the salt is treated with the halogenopropene. After completion of the addition, the reaction mixture is stirred for a further 1 to 24 hours to complete the reaction, if necessary whilst warming, and is then allowed to cool to room temperature. The mixture is worked-up in the usual manner by taking up the reaction product, which has separated out as an oil, in one of the above-mentioned hydrocarbons, preferably benzene, washing and drying the organic phase, evaporating the solvent and, if appropriate, subsequently fractionally distilling the residue.

The products are in most cases obtained in the form of colorless to pale yellow-colored water-insoluble oils which can either be distilled, without decomposition, under greatly reduced pressure or - where this is not possible - can at least be freed of the last volatile impurities by brief heating to slightly to moderately elevated temperatures e.g., about 40° to 80°C.

As already mentioned above, the thiol- and thionothiol-phosphoric or -phosphonic acid esters according to the invention are distinguished by excellent insecticidal, acaricidal and nematicidal properties with, in part, extremely low phytotoxicity. The pesticidal action starts rapidly and continues for a long time. The compounds may therefore be successfully employed in plant protection and the protection of stored products and in the hygiene field, for combating harmful sucking and biting insects, diptera, mites (Acarina) and nematodes. They are furthermore suitable for combating soil insects.

To the sucking insects there belong, in the main, aphids (Aphididae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*), and, further, cicadas, such as *Euscelis bilobatus* and *Nephotettix bipunctatus*.

In the case of the biting insects, above all there should be mentioned butterfly caterpillars (Lepidoptera) such as the diamond-back moth (*Plutella maculipennis*), the gypsy moth ( *Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kuhniella*) and greater wax moth (*Galleria mellonella*).

Also be classed with the biting insects are beetles (Coleoptera), for example the granary weevil (*Sitophilus granarius = Calandra granaria*), the Colorado beetle (*Leptinotarsa decemlineata*), the dock beetle (*Gastrophysa viridula*), the mustard beetle (*Phaedon cochlearia*), the blossom beetle (*Meligethes aeneus*), the raspberry beetle (*Byturus tomentosus*), the bean weevil (*Bruchidius = Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), but also species living in the soil, for example wireworms (Agriotes spec.) and larvae of the cockchafer (*Melelontha melolontha*); cockroaches, such as the German cockroach (*Blattella germanica*), American cockroach (*Periplaneta americana*), Madeira cockroach (*Leucophaea* or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Gryllus domesticus*); termites such as the eastern subterranean termite (*Reticulitermes flavipes*) and Hymenoptera such as ants, for example the garden ant (*Lasius niger*).

The Diptera comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*).

With the mites (Acarina) there are classed, in particular, the spider mites (Tetranychidae) such as the two-spotted spider mite (*Tetranychus urticae*) and the European red mite (*Paratetranychus pilosus = Panonychus ulmi*), gall mites, for example the blackcurrant gall mite (*Eriophyes ribis*) and tarsonemids, for example the broad mite (*Hemitarsonemus latus*) and the cyclamen mite (*Tarsonemus pallidus*); finally ticks, such as the relapsing fever tick (*Ornithodorus moubata*).

To the phytopathogenic nematodes there belong, in the main, bud and leaf nematodes (Aphelenchoides), such as the chrysanthemum foliar nematode (*A. ritzemabosi*), the spring crimp nematode (*A. fragariae*) and rice nematode (*A. oryzae*); stem nematodes (Ditylenchus), for example the stem and bulb nematode (*D. dipsaci*); root knot nematodes (Meloidogyne), such as *M. arenaris* and *M. incognita*; cyst nematodes (Heterodera), such as the golden nematode of potato (*H. rostochiensis*) and the sugar beet nematode (*H. schachtii*); and also dagger nematodes, for example of the genera Pratylenchus, Paratylenchus, Rotylenchus, Xiphinema and Radopholus.

When applied against pests harmful to health and pests of stored products, particularly flies and mosquitoes, the present compounds are also distinguished by an outstanding residual activity on wood and clay as well as a good stability to alkali on limed substrates.

The active compounds according to the instant invention can be utilized, if desired, in the form of the usual formulations or compositions with conventional inert (i.e., plant compatible or herbicidally inert) pesticide diluents or extenders, i.e., diluents, carriers or extenders of the type usable in conventional pesticide formulations or compositions, e.g., conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g., conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g., benzene, toluene, xylene, alkyl naphthalenes, etc.), halogenated, especially chlorinated, aromatic hydrocarbons (e.g. chlorobenzenes, etc.), cycloalkanes (e.g., cyclohexane, etc.), paraffins (e.g., petroleum or mineral oil fractions), chlorinated aliphatic hydrocarbons (e.g., methylene chloride, chloroethylenes, etc.), alcohols (e.g., methanol, ethanol, propanol, butanol, glycol, etc.) as well as ethers and esters thereof (e.g., glycol monomethyl ether, etc.), amines (e.g., ethanolamine, etc.), amides (e.g., dimethyl formamide, etc.), sulfoxides (e.g., dimethyl sulfoxide, etc.), acetonitrile, ketones (e.g., acetone, methyl ethyl ketone, methyl isobutyl ketone, cyclohexanone, etc.), and/or water; as well as inert dispersible finely divided solid carriers, such as ground natural minerals (e.g., kaolins, clays, alumina, silica, chalk, i.e., calcium carbonate, talc, attapulgite, montmorillonite, kieselguhr, etc.) and ground synthetic minerals (e.g., highly dispersed silicic acid, silicates, e.g., alkali silicates, etc.); whereas the following may be chiefly considered for use as conventional carrier vehicle assistants, e.g., surface-active agents, for this purpose: emulsifying agents, such as non-ionic and/or anionic emulsifying agents (e.g., polyethylene oxide esters of fatty acids, polyethylene oxide ethers of fatty alcohols, alkyl sulfates, alkyl sulfonates, aryl sulfonates, albumin hydrolyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides, acaricides and nematicides, or rodenticides, fungicides, bactericides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent by weight, and preferably 0.5–90 percent by weight, of the mixture, whereas carrier composition mixtures suitable for direct application or field application generally contemplate those in which the active compound is present in an amount substantially between about 0.0001–10 percent, preferably 0.01–1 percent, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally between about 0.0001–95 percent, and preferably 0.01–95 percent, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g., average particle diameter of from 50–100 microns, or even less, i.e., mist form, for example by airplane crop spraying techniques. Only up to at most about a few liters/hectare are needed, and often only up to about 15 to 1000 g/hectare, preferably 40 to 600 g/hectare, are sufficient. In this process it is possible to use highly concentrated liquid compositions with said liquid carrier vehicles containing from about 20 to about 95 percent by weight of the active compound or even the 100 percent active substance alone, e.g., about 20–100 percent by weight of the active compound.

Furthermore, the present invention contemplates methods of selectively killing, combating or controlling pests, e.g., insects, acarids and nematodes, which comprises applying to at least one of correspondingly (a) such insects, (b) such acarids, (c) such nematodes, and (d) the corresponding habitat thereof, i.e., the locus to be protected, a correspondingly combative or toxic amount, i.e., an insecticidally, acaricidally or nematicidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, dressing, incrustation, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

Drosophila test
Solvent: 3 parts by weight of acetone

Emulsifier: 1 part by weight of alkylaryl polyglycol ether

To produce a suitable preparation of active compound, 1 part by weight of the active compound is mixed with the stated amount of solvent containing the stated amount of emulsifier, and the concentrate is diluted with water to the desired concentration.

1 cm$^3$ of the preparation of the active compound is applied with a pipette to a filter paper disc of 7 cm diameter. The wet disc is placed in a glass vessel containing 50 vinegar flies (*Drosophila malanogaster*) and covered with a glass plate.

After the specified periods of time, the destruction is determined as a percentage: 100 percent means that all the flies are killed; 0 percent means that none of the flies are killed.

The active compounds, their concentrations, the evaluation times and the degree of destruction can be seen from the following table:

EXAMPLE 2

Phaedon larvae test
Solvent: 3 parts by weight of acetone
Emulsifier: 1 part by weight of alkylaryl polyglycol ether To produce a suitable preparation of active compound, 1 part by weight of the active compound is mixed with the stated amount of solvent containing the stated amount of emulsifier, and the concentrate is diluted with water to the desired concentration.

Cabbage leaves (*Brassica oleracea*) are sprayed with the preparation of the active compound until dripping wet and then infested with mustard beetle larvae (*Phaedon cochleariae*).

After the specified periods of time, the degree of destruction is determined as a percentage: 100 percent means that all the beetle larvae are killed; 0 percent means that none of the beetle larvae are killed.

The active compounds, the concentrations of the ac-

Table 1

(Drosophila Test)

| Active compound | Active compound concentration in % by weight | Degree of destruction in % after 1 day |
|---|---|---|
| $(CH_3O)_2\overset{O}{\underset{\|}{P}}-S-CH_2-CH_2-SC_2H_5$ (known) (A) | 0.1 | 100 |
|  | 0.01 | 0 |
| $(C_2H_5O)_2\overset{S}{\underset{\|}{P}}-S-CH_2-\underset{Cl}{\underset{\|}{C}}=\underset{Cl}{\underset{\|}{CH}}$ (2) | 0.1 | 100 |
|  | 0.01 | 100 |
|  | 0.001 | 100 |
|  | 0.0001 | 100 |
|  | 0.00001 | 50 |
| $(C_2H_5O)_2\overset{O}{\underset{\|}{P}}-S-CH_2-\underset{Cl}{\underset{\|}{C}}=\underset{Cl}{\underset{\|}{CH}}$ (3) | 0.1 | 100 |
|  | 0.01 | 100 |
|  | 0.001 | 100 |
| $\underset{C_2H_5O}{\overset{CH_3}{>}}\overset{S}{\underset{\|}{P}}-S-CH_2-\underset{Cl}{\underset{\|}{C}}=\underset{Cl}{\underset{\|}{CH}}$ (5) | 0.1 | 100 |
|  | 0.01 | 100 |
|  | 0.001 | 100 |
|  | 0.0001 | 100 |
|  | 0.00001 | 50 |
| $\underset{i-C_3H_7O}{\overset{CH_3}{>}}\overset{S}{\underset{\|}{P}}-S-CH_2-\underset{Cl}{\underset{\|}{C}}=\underset{Cl}{\underset{\|}{CH}}$ (6) | 0.1 | 100 |
|  | 0.01 | 100 |
|  | 0.001 | 100 |
|  | 0.0001 | 100 |
| $\underset{C_2H_5O}{\overset{C_2H_5}{>}}\overset{S}{\underset{\|}{P}}-S-CH_2-\underset{Cl}{\underset{\|}{C}}=\underset{Cl}{\underset{\|}{CH}}$ (1) | 0.1 | 100 |
|  | 0.01 | 100 |
|  | 0.001 | 100 |
|  | 0.0001 | 100 |
|  | 0.00001 | 50 | tive compounds, the times of evaluation and the results can be seen from the following table:

stated amount of emulsifier and the concentrate is diluted with water to the desired concentration.

Table 2

(Phaedon larvae test)

| Active compound | Active compound concentration in % by weight | Degree of destruction in % after 3 days |
|---|---|---|
| $\begin{array}{c}C_2H_5\\C_2H_5O\end{array}\!\!>\!\!\overset{S}{\underset{\|}{P}}\!-\!S\!-\!CH_2\!-\!CH\!=\!CH_2$ (known) (B) | 0.1 | 0 |
| $(C_2H_5O)_2\overset{S}{\underset{\|}{P}}\!-\!S\!-\!CH_2\!-\!\underset{Cl}{\overset{\|}{C}}\!=\!\underset{Cl}{\overset{\|}{CH}}$ (2) | 0.1 | 100 |
| $(C_2H_5O)_2\overset{O}{\underset{\|}{P}}\!-\!S\!-\!CH_2\!-\!\underset{Cl}{\overset{\|}{C}}\!=\!\underset{Cl}{\overset{\|}{CH}}$ (3) | 0.1 | 100 |
| $\begin{array}{c}CH_3\\C_2H_5O\end{array}\!\!>\!\!\overset{S}{\underset{\|}{P}}\!-\!S\!-\!CH_2\!-\!\underset{Cl}{\overset{\|}{C}}\!=\!\underset{Cl}{\overset{\|}{CH}}$ (5) | 0.1 0.01 | 100 90 |
| $\begin{array}{c}CH_3\\i\text{-}C_3H_7O\end{array}\!\!>\!\!\overset{S}{\underset{\|}{P}}\!-\!S\!-\!CH_2\!-\!\underset{Cl}{\overset{\|}{C}}\!=\!\underset{Cl}{\overset{\|}{CH}}$ (6) | 0.1 | 100 |
| $\begin{array}{c}C_2H_5\\C_2H_5O\end{array}\!\!>\!\!\overset{S}{\underset{\|}{P}}\!-\!S\!-\!CH_2\!-\!\underset{Cl}{\overset{\|}{C}}\!=\!\underset{Cl}{\overset{\|}{CH}}$ (1) | 0.1 | 100 |
| $\begin{array}{c}C_2H_5O\\C_6H_5\end{array}\!\!>\!\!\overset{O}{\underset{\|}{P}}\!-\!S\!-\!CH_2\!-\!\underset{Cl}{\overset{\|}{C}}\!=\!\underset{Cl}{\overset{\|}{CH}}$ (4) | 0.1 | 100 |

EXAMPLE 3

Myzus test (contact action)
Solvent: 3 parts by weight of acetone
Emulsifier: 1 part by weight of alkylaryl polyglycol ether To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100 percent means that all the aphids are killed, whereas 0 percent means that none of the aphids are killed.

The active compounds, the concentrations of the active compounds, the evaluation times and the results can be seen from the following table:

Table 3

(Myzus test)

| Active compound | Active compound concentration in % by weight | Degree of destruction in % after 1 day |
|---|---|---|
| $\begin{array}{c}C_2H_5\\ \phantom{xx}\diagdown\\ C_2H_5O\end{array}\!\!\!\!\!\!\overset{S}{\underset{}{\overset{\|}{P}}}\!\!-S-CH_2-CH=CH_2$  (known) (B) | 0.1<br>0.01 | 100<br>0 |
| $\begin{array}{c}CH_3\\ \phantom{xx}\diagdown\\ C_2H_5O\end{array}\!\!\!\!\!\!\overset{S}{\underset{}{\overset{\|}{P}}}\!\!-S-CH_2-\underset{Cl}{\overset{}{C}}=\underset{Cl}{\overset{}{CH}}$  (5) | 0.1<br>0.01 | 100<br>70 |
| $\begin{array}{c}C_2H_5\\ \phantom{xx}\diagdown\\ C_2H_5O\end{array}\!\!\!\!\!\!\overset{S}{\underset{}{\overset{\|}{P}}}\!\!-S-CH_2-\underset{Cl}{\overset{}{C}}=\underset{Cl}{\overset{}{CH}}$  (1) | 0.1<br>0.01 | 100<br>100 |
| $\begin{array}{c}C_2H_5O\\ \phantom{xx}\diagdown\\ \phenyl\end{array}\!\!\!\!\!\!\overset{O}{\underset{}{\overset{\|}{P}}}\!\!-S-CH_2-\underset{Cl}{\overset{}{C}}=\underset{Cl}{\overset{}{CH}}$  (4) | 0.1<br>0.01 | 100<br>95 |

EXAMPLE 4

Tetranychus test (resistant)
Solvent: 3 parts by weight of acetone
Emulsifier: 1 part by weight of alkylaryl polyglycol ether To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm, are sprayed with the preparation of the active compound until dripping wet. These bean plants are heavily infested with the two-spotted spider mite (*Tetranychus urticae*) in all stages of development.

After the specified periods of time, the effectiveness of the preparation of active compound is determined by counting the dead mites. The degree of destruction thus obtained is expressed as a percentage: 100 percent means that all the spider mites are killed whereas 0 percent means that none of the spider mites are killed.

The active compounds, the concentrations of the active compounds, the evaluation times and the results can be seen from the following table:

Table 4

(Tetranychus test / resistant)

| Active compound | Active compound concentration in % by weight | Degree of destruction in % after 2 days |
|---|---|---|

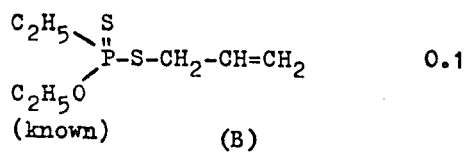
(known) (B)
0.1 — 0

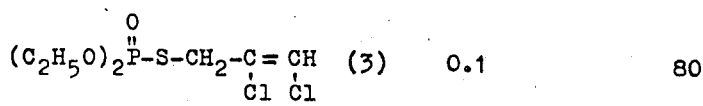
(3) 0.1 — 80

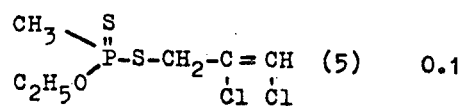
(5) 0.1 — 100

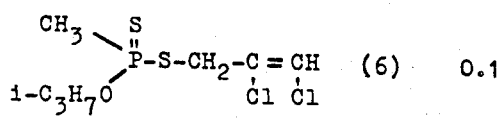
(6) 0.1 — 70

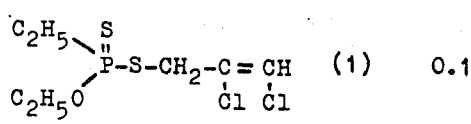
(1) 0.1 — 80

EXAMPLE 5

Critical concentration test / soil insects
Test insect: Tenebrio molitor larvae
Solvent: acetone
Emulsifier: alkylaryl polyglycol ether To produce a suitable preparation of active compound, 1 part by weight of active compound is mixed with the stated amount of solvent, the stated amount of emulsifier is added and the concentrate is diluted with water to the desired concentration. The preparation of active compound is intimately mixed with the soil. The concentration of the active compound in the preparation is of practically no importance; only the amount by weight of active compound per unit volume of soil, which is given in p.p.m. (for example mg/l), is decisive. The soil is filled into pots, and the pots are allowed to stand at room temperature. After 24 hours the test insects are introduced into the treated soil and after a further 48 hours the degree of effectiveness (in percent) of the active compound is determined by counting the dead and live test insects. The degree of effectiveness is 100 percent when all test insects have been killed and is 0 percent when exactly as many test insects are still alive as in the case of the control.

The active compounds, the amounts applied and the results can be seen from the following table:

Table 5

(Tenebrio molitor larvae test)

| Active compound | Active compound concentration in ppm | Degree of effectiveness in % |
|---|---|---|
| $\begin{array}{c}CH_3O\\ \phantom{xx}\diagdown\overset{O}{\underset{\|}{P}}-S-CH_2-CH_2-SC_2H_5\\ CH_3O\diagup\end{array}$ (known) (A) | 40<br>20 | 100<br>0 |
| $\begin{array}{c}C_2H_5\\ \phantom{xx}\diagdown\overset{S}{\underset{\|}{P}}-S-CH_2-CH=CH_2\\ C_2H_5O\diagup\end{array}$ (known) (B) | 20 | 0 |
| $\begin{array}{c}C_2H_5\\ \phantom{xx}\diagdown\overset{S}{\underset{\|}{P}}-S-CH_2-C=CH \quad (1)\\ C_2H_5O\diagup\phantom{xxxxxx}\underset{\|}{Cl}\phantom{x}\underset{\|}{Cl}\end{array}$ | 40<br>20<br>10 | 100<br>100<br>70 |
| $\begin{array}{c}CH_3\\ \phantom{xx}\diagdown\overset{S}{\underset{\|}{P}}-S-CH_2-C=CH \quad (5)\\ C_2H_5O\diagup\phantom{xxxxxx}\underset{\|}{Cl}\phantom{x}\underset{\|}{Cl}\end{array}$ | 10<br>5<br>2.5 | 100<br>95<br>50 |
| $\begin{array}{c}CH_3\\ \phantom{xx}\diagdown\overset{S}{\underset{\|}{P}}-S-CH_2-C=CH \quad (6)\\ i-C_3H_7O\diagup\phantom{xxxxxx}\underset{\|}{Cl}\phantom{x}\underset{\|}{Cl}\end{array}$ | 10<br>5<br>2.5 | 100<br>80<br>50 |

EXAMPLE 6

Critical concentration test
Test nematode: Meloidogyne spec.
Solvent: 3 parts by weight of acetone
Emulsifier: 1 part by weight of alkylaryl polyglycol ether To produce a suitable preparation of active compound, 1 part by weight of active compound is mixed with the stated amount of solvent, the stated amount of emulsifier is added and the concentrate is diluted with water to the desired concentration.

The preparation of active compound is intimately mixed with soil which is heavily infested with the test nematodes. The concentration of the active compound in the preparation is of practically no importance; only the amount of active compound per unit volume of soil, which is given in p.p.m., is decisive. The soil is filled into pots, lettuce is sown in and the pots are kept at a greenhouse temperature of 27°C. After 4 weeks, the lettuce roots are examined for infestation with nematodes, and the degree of effectiveness of the active compound is determined as a percentage. The degree of effectiveness is 100 percent when infestation is completely avoided; it is 0 percent when the infestation is exactly the same as in the case of the control plants in untreated soil which has been infested in the same manner.

The active compounds, the amounts applied and the results can be seen from the following table:

Table 6

(Meloidogyne spec. test)

| Active compound | Active compound concentration in ppm | Degree of destruction in % |
|---|---|---|
| $\begin{array}{c}CH_3O\\ \phantom{x}\\CH_3O\end{array}\!\!\!>\!\!\!\overset{\overset{O}{\|}}{P}\!-S\!-\!CH_2\!-\!CH_2\!-\!SC_2H_5$ (known) | 40 | 0 |
| $\begin{array}{c}C_2H_5\\ \phantom{x}\\C_2H_5O\end{array}\!\!\!>\!\!\!\overset{\overset{S}{\|}}{P}\!-S\!-\!CH_2\!-\!CH\!=\!CH_2$ (known) | 20 | 0 |
| $\begin{array}{c}C_2H_5\\ \phantom{x}\\C_2H_5O\end{array}\!\!\!>\!\!\!\overset{\overset{S}{\|}}{P}\!-S\!-\!CH_2\!-\!\underset{Cl}{C}\!=\!\underset{Cl}{CH}$ (1) | 40<br>20<br>10 | 100<br>100<br>100 |
| $\begin{array}{c}CH_3\\ \phantom{x}\\C_2H_5O\end{array}\!\!\!>\!\!\!\overset{\overset{S}{\|}}{P}\!-S\!-\!CH_2\!-\!\underset{Cl}{C}\!=\!\underset{Cl}{CH}$ (5) | 20<br>10<br>5 | 98<br>90<br>80 |

The preparative process of this invention is illustrated in and by the following Examples.

EXAMPLE 7 a. The 1-bromo-2,3-dichloropropene-2 required as the starting material can be obtained, for example, as follows:

$$Br-CH_2-\underset{Cl}{C}=CH-Cl \qquad (III)$$

3 MOLAR BATCH 215 g of chlorine are introduced into 280 g of propargyl alcohol while stirring continuously at 10° to 20°C. Thereafter 100 ml of phosphorus tribromide are added to the reaction mixture at 20° to 40°C and the mixture is stirred for a further hour at 40°C and then taken up in 400 ml of methylene chloride. Thereafter the solution is washed with ice-water and separated off. The organic layer is dried over sodium sulfate and then fractionally distilled. 330 g (58 percent of theory) of 1-bromo-2,3-dichloropropene-2 of boiling point 50°C/15 mm Hg and of refractive index $n_D^{25} = 1.5291$ are obtained.

b)

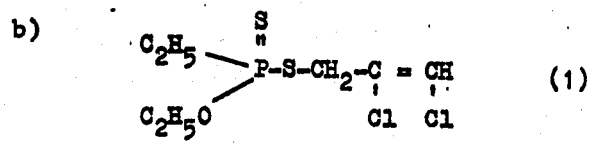

0.4 MOLAR BATCH 88 g of potassium ethyl-0-ethyl-thionothiolphosphonate are dissolved in 100 ml of acetonitrile. 76 g of 1-bromo-2,3-dichloropropene-2 (boiling point 50°C/15 mm Hg) are added to this solution at 10° to 20°C while stirring; the mixture is stirred for a further hour and the reaction mixture is then taken up in 200 ml of benzene. The benzene solution is washed with ice-water and subsequently dried over sodium sulfate. After evaporation of the solvent, 103 g (92 percent of theory) of the ethyl-0-ethyl-S-(2,3-dichloroallyl)-thionothiol-phosphonic acid ester are obtained as a colorless water-insoluble oil of refractive index $n_D^{22} = 1.5572$.

| Calculated for a molecular weight of 279: | | | |
|---|---|---|---|
| P | 11.1%; | found: | 11.1%; |
| S | 22.9%; | | 22.6%; |
| Cl | 25.5%; | | 25.3%. |

EXAMPLE 8

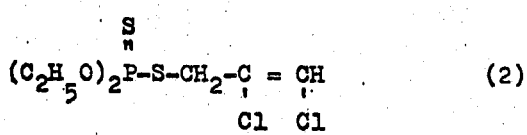

0.4 MOLAR BATCH 88 g of potassium 0,0-diethyl-thionothiol-phosphate are dissolved in 300 ml of acetonitrile. 76 g of 1-bromo-2,3-dichloropropene-2, dissolved in 100 ml of acetonitrile, are added to this solution at room temperature, while stirring; the reaction mixture is stirred for a further 4 hours at room temperature and then worked-up as in Example 7. 105 g (98 percent of theory) of 0,0-diethyl-S-(2,3-dichloroallyl)-thionothiolphosphoric acid ester are obtained as a colorless, water-insuluble oil of boiling point 105°C/0.01 mm Hg and refractive index $n_D^{22} = 1.5387$.

EXAMPLE 9

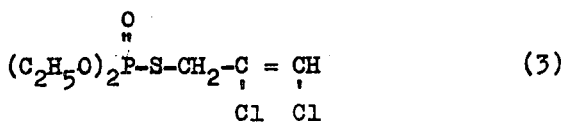

0.4 MOLAR BATCH 80 g of 1-bromo-2,3-dichloropropene-2 are dissolved in 400 ml of acetonitrile. 80 g of ammonium O,O-diethylthiolphosphate dissolved in 200 ml of acetonitrile are added to this solution at room temperature, while stirring; the mixture is subsequently stirred for a further 12 hours and then worked-up as described in Example 7. 97 g (87 percent of theory) of O,O-diethyl-S-(2,3-dichloroallyl)-thiol-phosphoric acid ester are obtained as a pale yellow, water-insoluble oil of refractive index $n_D^{25} = 1.4999$.

| Calculated for a molecular weight of 279: | | | |
|---|---|---|---|
| P | 11.1%; | found: | 10.9%; |
| S | 11.4%; | | 11.1%; |
| Cl | 25.4%; | | 25.3%. |

EXAMPLE 10

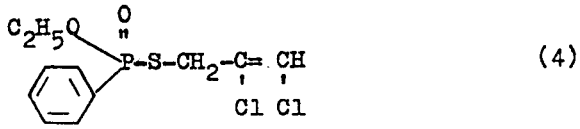

0.4 MOLAR BATCH 80 g of 1-bromo-2,3-dichloropropene-2 are dissolved in 400 ml of acetonitrile. 96 g of potassium phenyl-0-ethylthiol-phosphonate dissolved in 150 ml of acetonitrile are added to this solution, while stirring; the mixture is stirred for a further 12 hours at room temperature and then worked-up in the manner described in Example 7. 117 g (94 percent of theory) of the phenyl-0-ethyl-S-(2,3-dichloroallyl)-thiolphosphonic acid ester are obtained as a yellow, water-insoluble oil of refractive index $n_D^{25} = 1.5617$.

| Calculated for a molecular weight of 311: | | | |
|---|---|---|---|
| P | 10.0%; | found: | 9.8%; |
| S | 10.3%; | | 10.0%; |
| Cl | 22.8%; | | 22.3%. |

EXAMPLE 11

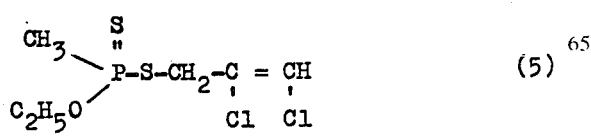

0.3 MOLAR BATCH 58 g of 1-bromo-2,3-dichloropropene-2 are dissolved in 60 ml of acetonitrile. 60 g of potassium ethyl-0-ethylthionothiol-phosphonate dissolved in 300 ml of acetonitrile, are added to this solution while stirring; the mixture is stirred for a further 12 hours at room temperature and then worked-up as described in Example 1. In this way, 57 g (72 percent of theory) of the m-ethyl-O-ethyl-S-(2,3-dichloroallyl)-thionothiol-phosphonic acid ester are obtained in the form of a water-insoluble colorless oil of refractive index $n_D^{23} = 1.5635$.

| Calculated for a molecular weight of 265: | | | |
|---|---|---|---|
| P | 11.7%; | found: | 11.8%; |
| S | 24.2%; | | 24.2%; |
| Cl | 26.4%; | | 26.1%. |

EXAMPLE 12

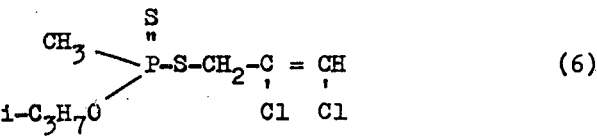

0.3 MOLAR BATCH 58 g of 1-bromo-2,3-dichloropropene-2 are dissolved in 350 ml of acetonitrile. 62 g of potassium methyl-0-isopropyl-thionothiol-phosphonate dissolved in 200 ml of acetonitrile are added to the resulting solution while stirring at room temperature and the batch is stirred for a further 6 hours and then worked-up as in Example 7. 70 g (84 percent of theory) of the methyl-0-isopropyl-S-(2,3-dichloroallyl)-thionothiol-phosphonic acid ester are obtained in the form of a water-insoluble, colorless oil of refractive index $n_D^{23} = 1.5550$.

| Calculated for a molecular weight of 279: | | | |
|---|---|---|---|
| P | 11.1%; | found: | 11.2%; |
| S | 22.9%; | | 23.0%; |
| Cl | 25.4%; | | 25.0%. |

It will be appreciated that the instant specification and examples are set forth by way of illustration and not limitation, and that various modifications and changes may be made without departing from the spirit and scope of the present invention.

What we claim is:

1. A thiol- or thionothiol-S-(2,3-dichloroallyl)phosphonic acid ester of the formula

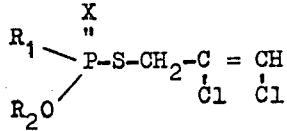

in which
$R_1$ is $C_1$-$C_6$ alkyl or phenyl,
$R_2$ is $C_1$-$C_6$ alkyl, and
X is oxygen or sulfur.

2. A compound according to claim 1 in which $R_1$ is $C_1$-$C_4$ lower alkyl or phenyl, and $R_2$ is lower $C_1$-$C_4$ is lower alkyl.

3. The compound according to claim 1 wherein such compound is ethyl-0-ethyl-S-(2,3-dichloroallyl)-thionothiol phosphonic acid ester of the formula

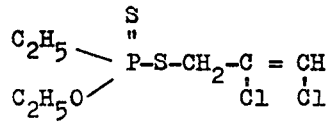

4. The compound according to claim 1 wherein such compound is methyl-0-ethyl-S-(2,3-dichloroallyl)-thionothiol phosphonic acid ester of the formula

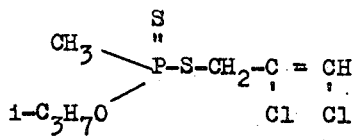

5. The compound according to claim 1 wherein such compound is methyl-0-isopropyl-S-(2,3-dichloroallyl)-thionothiol phosphonic acid ester of the formula

* * * * *